United States Patent
Wu

(10) Patent No.: US 9,030,171 B2
(45) Date of Patent: May 12, 2015

(54) CHARGING CIRCUIT FOR ELECTRONIC DEVICE AND RELATED CHARGING METHOD

(71) Applicant: Wistron Corporation, New Taipei (TW)

(72) Inventor: Te-Lung Wu, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 156 days.

(21) Appl. No.: 13/932,013

(22) Filed: Jul. 1, 2013

(65) Prior Publication Data

US 2014/0292278 A1    Oct. 2, 2014

(30) Foreign Application Priority Data

Apr. 2, 2013    (TW) .............................. 102111977 A

(51) Int. Cl.
*H02J 7/00*    (2006.01)

(52) U.S. Cl.
CPC ............. *H02J 7/0003* (2013.01); *H02J 7/0052* (2013.01)

(58) Field of Classification Search
CPC ..................................................... H02J 7/0052
USPC .......... 320/107–108, 112, 137, 149, 158, 162
See application file for complete search history.

(56) References Cited

U.S. PATENT DOCUMENTS

| | | | |
|---|---|---|---|
| 6,894,461 B1* | 5/2005 | Hack et al. | 323/205 |
| 2011/0227543 A1* | 9/2011 | Ivanov | 320/163 |
| 2012/0274395 A1 | 11/2012 | Deam | |
| 2013/0088203 A1* | 4/2013 | Solie | 320/129 |

FOREIGN PATENT DOCUMENTS

| | | |
|---|---|---|
| CN | 201266840 Y | 7/2009 |
| WO | 2012075301 A2 | 6/2012 |

OTHER PUBLICATIONS

Office action mailed on Nov. 18, 2014 for the Taiwan application No. 102111977, filing date: Apr. 2, 2013, p. 1 line 11-12, p. 2-4 and p. 5 line 1-19.

* cited by examiner

*Primary Examiner* — Paul Dinh
(74) *Attorney, Agent, or Firm* — Winston Hsu; Scott Margo

(57) ABSTRACT

A charging circuit for an electronic device includes a battery pack for providing a battery voltage; an adaptor coupled to an external voltage source, for providing an input voltage; and a charging module coupled to the adaptor, for charging the battery pack. The charging module includes a buck charging unit for performing buck charging on the battery pack according to a comparison result; and a boost charging unit for performing boost charging on the battery pack according to the comparison result.

14 Claims, 4 Drawing Sheets

CHARGING CIRCUIT FOR ELECTRONIC DEVICE AND RELATED CHARGING METHOD

BACKGROUND OF THE INVENTION

1. Field of the Invention

The present invention relates to a charging circuit for an electronic device and a related charging method, and more particularly, to a charging circuit and a related charging method capable of performing different types of charging.

2. Description of the Prior Art

With rapid economic development in the world, living standard of people increases continuously. There are more and more portable electronic products emerging, such as laptop, tablet, mobile phone, digital camera, portable DVD player, personal digital assistant (PDA), MP3 player and global positioning system (GPS). Since these devices have to support long time usage, charging functions are required for batteries of these devices.

The selection of adaptors for modern portable electronic products has to be determined in consideration of both industrial design and charging circuit design. However, most of the charging circuits of available portable electronic products can only support buck charging. Once the selection of adaptors is limited such that feasible adaptors cannot be compatible with buck charging due to industrial design or other reasons, additional boost circuits should be applied to satisfy charging requirements. For example, sometimes there are only universal serial bus (USB) ports left by the manufacturer, and the USB ports can only provide 5V power. As a result, when the battery voltage of the portable electronic product is higher than 5V, the USB ports may not perform charging on the battery, and additional boost circuits must be required, which increases costs and circuit complexity.

Besides, in order to satisfy various applications of portable products, the battery has to support various types of adaptors, such that circuit areas maybe increased, printed circuit board (PCB) space may be reduced, and costs of design may also be increased, which further increases the difficulty of design.

SUMMARY OF THE INVENTION

It is therefore an objective of the present invention to provide a charging circuit capable of performing different types of charging according to a comparison result of an input voltage and a battery voltage.

An embodiment of the invention discloses a charging circuit for an electronic device. The charging circuit comprises a battery pack for providing a battery voltage; an adaptor coupled to an external voltage source, for providing an input voltage; and a charging module coupled to the adaptor, for charging the battery pack. The charging module comprises a buck charging unit for performing buck charging on the battery pack according to a comparison result; and a boost charging unit for performing boost charging on the battery pack according to the comparison result.

An embodiment of the invention further discloses a charging method for an electronic device having a battery pack. The charging method comprises comparing an input voltage and a battery voltage of the battery pack to generate a comparison result; and performing different types of charging on the battery pack according to the comparison result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
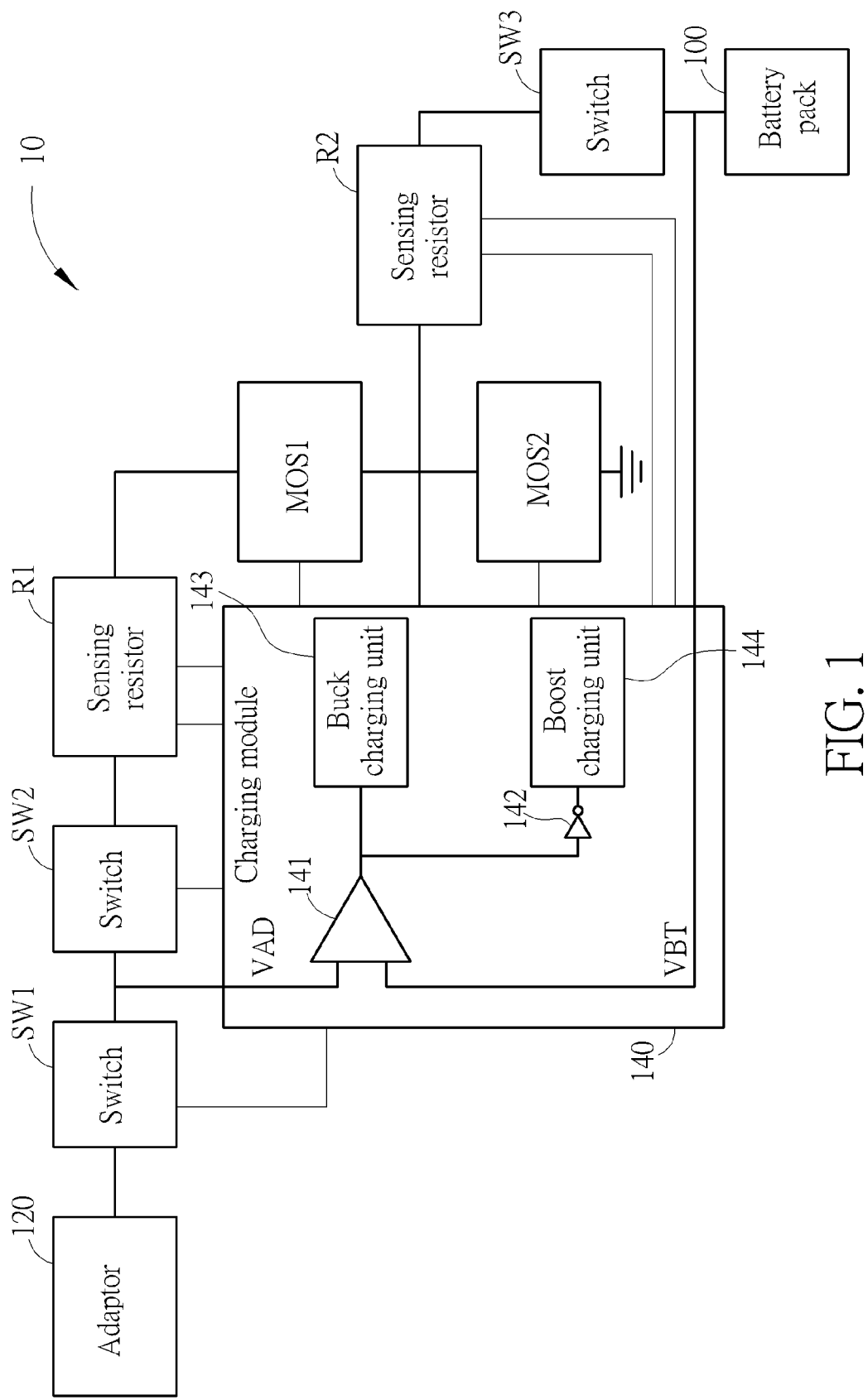
FIG. 1 is a schematic diagram of a charging circuit according to an embodiment of the invention.

Please refer to FIG. 1, which is a schematic diagram of a charging circuit 10 according to an embodiment of the invention. The charging circuit 10 can be utilized in a portable electronic device having a charging function, such as a laptop, tablet, mobile phone, digital camera, portable DVD player, personal digital assistant (PDA), MP3 player and global positioning system (GPS). The charging circuit 10 includes a battery pack 100, an adaptor 120, a charging module 140, a plurality of switches SW1, SW2 and SW3, a plurality of sensing resistors R1, R2 and a plurality of metal-oxide-semiconductor field-effect transistors (MOSFET) MOS1 and MOS2. The battery pack 100 is utilized for providing a battery voltage VBT, and preferably, the battery pack 100 includes at least one battery, i.e., the battery pack 100 has multiple batteries connected in series. The adaptor 120, coupled to an external voltage source (not illustrated in FIG. 1), is utilized for providing an input voltage VAD. The charging module 140, coupled to the adaptor 120, is utilized for performing charging on the battery pack 100. The charging module 140 includes a comparator 141, an inverter 142, a buck charging unit 143 and a boost charging unit 144. The comparator 141, coupled to the switches SW1 and SW2 and the battery pack 100, is utilized for comparing the input voltage VAD and the battery voltage VBT to generate a comparison result D1. The buck charging unit 143 is utilized for performing buck charging on the battery pack 100 according to the comparison result D1. The boost charging unit 144 is utilized for performing boost charging on the battery pack 100 according to the comparison result D1. The switches SW1 and SW2, coupled to the adaptor 120, are utilized for controlling the coupling between the adaptor 120 and the charging module 140 to be turned on or off. The switch SW3, coupled to the battery pack 100, is utilized for controlling the coupling of the battery pack 100 to be turned on or off. The sensing resistor R1, coupled between the switches SW1 and SW2, is utilized for detecting a current I1 from the adaptor 120. The sensing resistor R2, coupled to the battery pack 100, is utilized for detecting a current I2 entering the battery pack 100 when the battery pack 100 is charging. The MOSFET MOS1 and MOS2, coupled to the buck charging unit 143 and the boost charging unit 144, are utilized for driving the buck charging unit 143 and the boost charging unit 144.

When the adaptor 120 is connected to the external voltage source, the comparator 141 compares the input voltage VAD and the battery voltage VBT to generate the comparison result D1. When the comparison result D1 indicates that the input voltage VAD is greater than the battery voltage VBT, the buck charging unit 143 performs buck charging on the battery pack 100. When the comparison result D1 indicates that the input voltage VAD is less than the battery voltage VBT, the boost charging unit 144 performs boost charging on the battery pack 100. That is, according to an embodiment of the present invention, the charging circuit 10 can perform different types of charging (boost charging or buck charging) on the battery according to whether the input voltage VAD is greater than or less than the battery voltage VBT. Therefore, even if the input voltage VAD is less than the battery voltage VBT, the charging circuit 10 can still perform boost charging on the battery pack 100, and the charging function for the battery pack 100 is not limited to the condition that the input voltage VAD should be greater than the battery voltage VBT.

For example, the adaptor 120 may be a universal serial bus (USB) port, which can provide 5V power. The battery pack 100 is composed of two batteries connected in series, which can provide 8.4V power. According to an embodiment of the present invention, when the comparator 141 determines that the voltage provided by the USB port (5V) is less than the voltage of the serially connected battery pack (8.4V), the charging module 140 utilizes the boost charging unit 144 to perform boost charging on the serially connected battery pack. Therefore, according to the embodiment of the present invention, the portable electronic devices having charging functions does not require various adaptors to support different external voltage sources, and the battery can be charged without additional boost circuits, so that the costs and circuit complexity can be reduced significantly.

Figure 2:
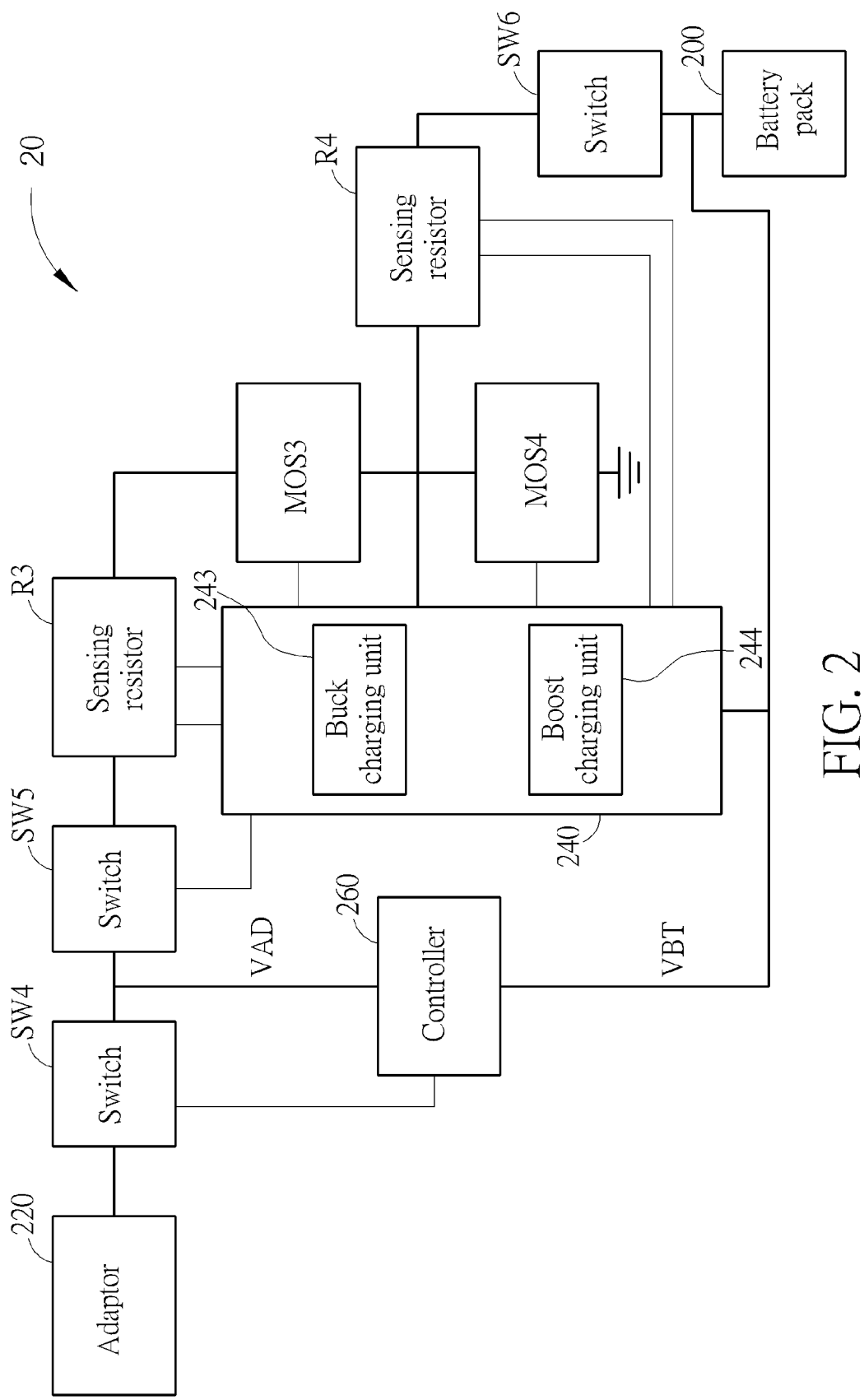
FIG. 2 is a schematic diagram of another charging circuit according to an embodiment of the invention.

Please refer to FIG. 2, which is a schematic diagram of another charging circuit 20 according to an embodiment of the invention. The charging circuit 20 can be utilized in a portable electronic device having a charging function, such as a laptop, tablet, mobile phone, digital camera, portable DVD player, PDA, MP3 player and GPS system. The charging circuit 20 includes a battery pack 200, an adaptor 220, a charging module 240, a controller 260, a plurality of switches SW4, SW5 and SW6, a plurality of sensing resistors R3, R4 and a plurality of MOSFET MOS3 and MOS4. Functions and purposes of the battery pack 200, the adaptor 220, the plurality of switches SW4, SW5 and SW6, the sensing resistors R3, R4 and the MOSFET MOS3 and MOS4 are similar to those of the battery pack 100, the adaptor 120, the plurality of switches SW1, SW2 and SW3, the sensing resistors R1, R2 and the MOSFET MOS1 and MOS2; hence detailed operations of these devices can be referred to the above description, and will not be narrated herein. Distinct from the charging circuit 10, the charging circuit 20 includes the controller 260. The controller 260 is coupled to the adaptor 220 and the battery pack 200, and is utilized for comparing the input voltage VAD and the battery voltage VBT to generate a comparison result D2. In addition, the charging module 240 includes a buck charging unit 243 and a boost charging unit 244. Functions and purposes of the buck charging unit 243 and the boost charging unit 244 are similar to those of the buck charging unit 143 and the boost charging unit 144; hence detailed operations of these devices can be referred to the above description, and will not be narrated herein.

The controller 260 first obtains battery information via system management bus (SM bus) or inter-integrated circuit (I2C). The battery information may include a voltage, charging current, etc. When the adaptor 220 is connected to the external voltage source, the controller 260 compares the input voltage VAD and the battery voltage VBT to generate the comparison result D2. When the comparison result D2 indicates that the input voltage VAD is greater than the battery voltage VBT, the controller 260 commands the charging module 240 via the SM bus or the I2C, so that the buck charging unit 243 performs buck charging on the battery pack 100. When the comparison result D2 indicates that the input voltage VAD is less than the battery voltage VBT, the controller 260 commands the charging module 240 via the SM bus or the I2C, so that the boost charging unit 244 performs boost charging on the battery pack 100. That is, the controller 260 replaces the comparator 141 to perform the function of comparing the input voltage VAD and the battery voltage VBT. Therefore, according to an embodiment of the present invention, the charging circuit 20 can perform different types of charging (boost charging or buck charging) on the battery according to whether the input voltage VAD is greater than or less than the battery voltage VBT. Even if the input voltage VAD is less than the battery voltage VBT, the charging circuit 20 can still perform boost charging on the battery pack 200, and the charging function for the battery pack 200 is not limited to the condition that the input voltage VAD should be greater than the battery voltage VBT. As a result, the portable electronic devices having charging functions will not require various adaptors to support different external voltage sources, and the battery can be charged without additional boost circuits.

Figure 3:
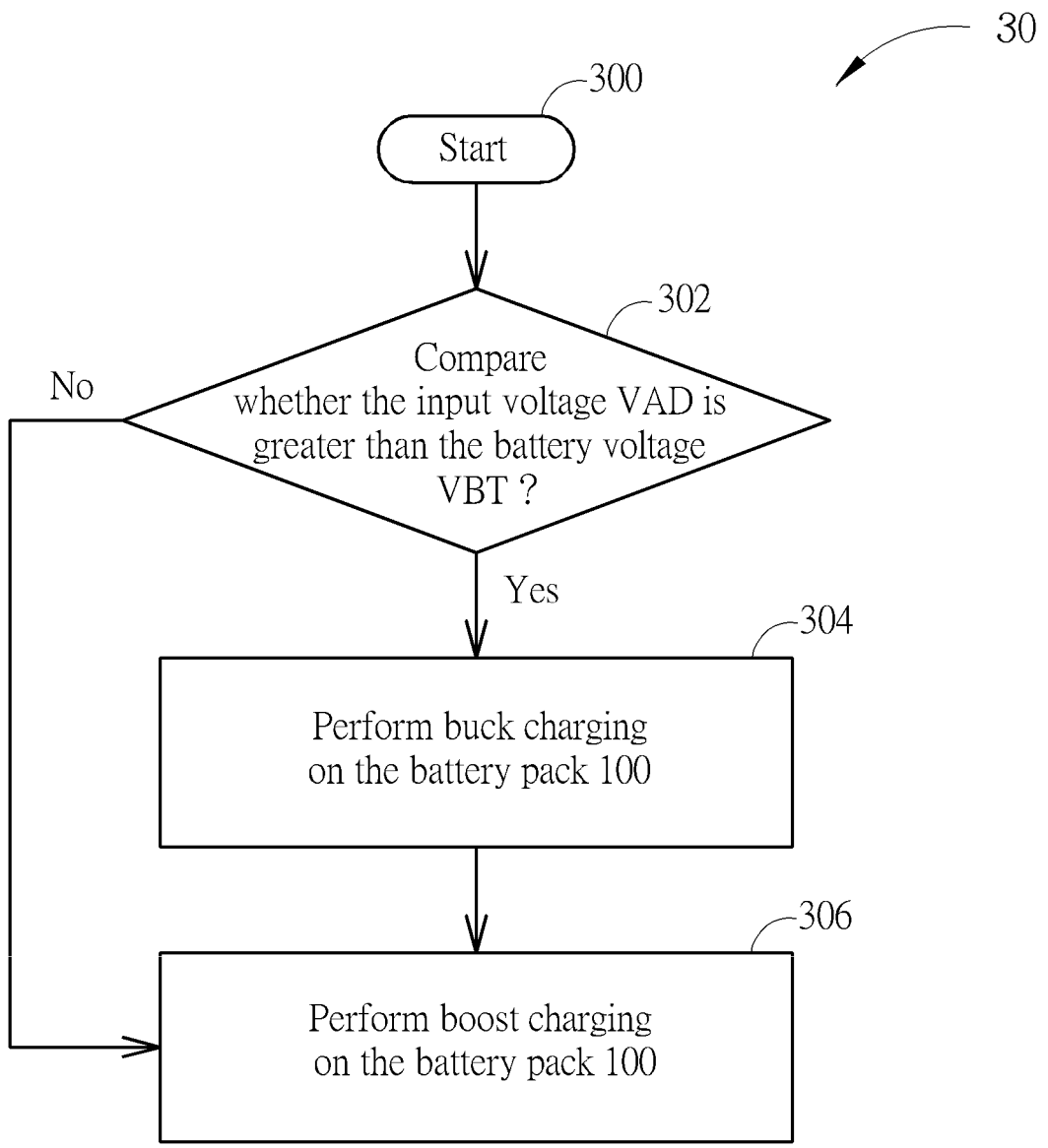
FIG. 3 is a schematic diagram of a process.

On the other hand, operations related to the above charging circuit 10 and charging circuit 20 can be summarized into a process 30 and a process 40, respectively. Please refer to FIG. 3, which is a schematic diagram of the process 30. The process 30 includes the following steps:

Step 300: Start.

Step 302: Compare whether the input voltage VAD is greater than the battery voltage VBT? If yes, go to Step 304; otherwise, go to Step 306.

Step 304: Perform buck charging on the battery pack 100.

Step 306: Perform boost charging on the battery pack 100.

Step 308: End.

The process 30 is related to the operations of the charging circuit 10, which is detailed in the above paragraphs and will not be narrated herein. Therefore, by using the process 30, the charging circuit 10 can perform boost or buck charging on the battery according to whether the input voltage VAD is greater than or less than the battery voltage VBT.

Figure 4:
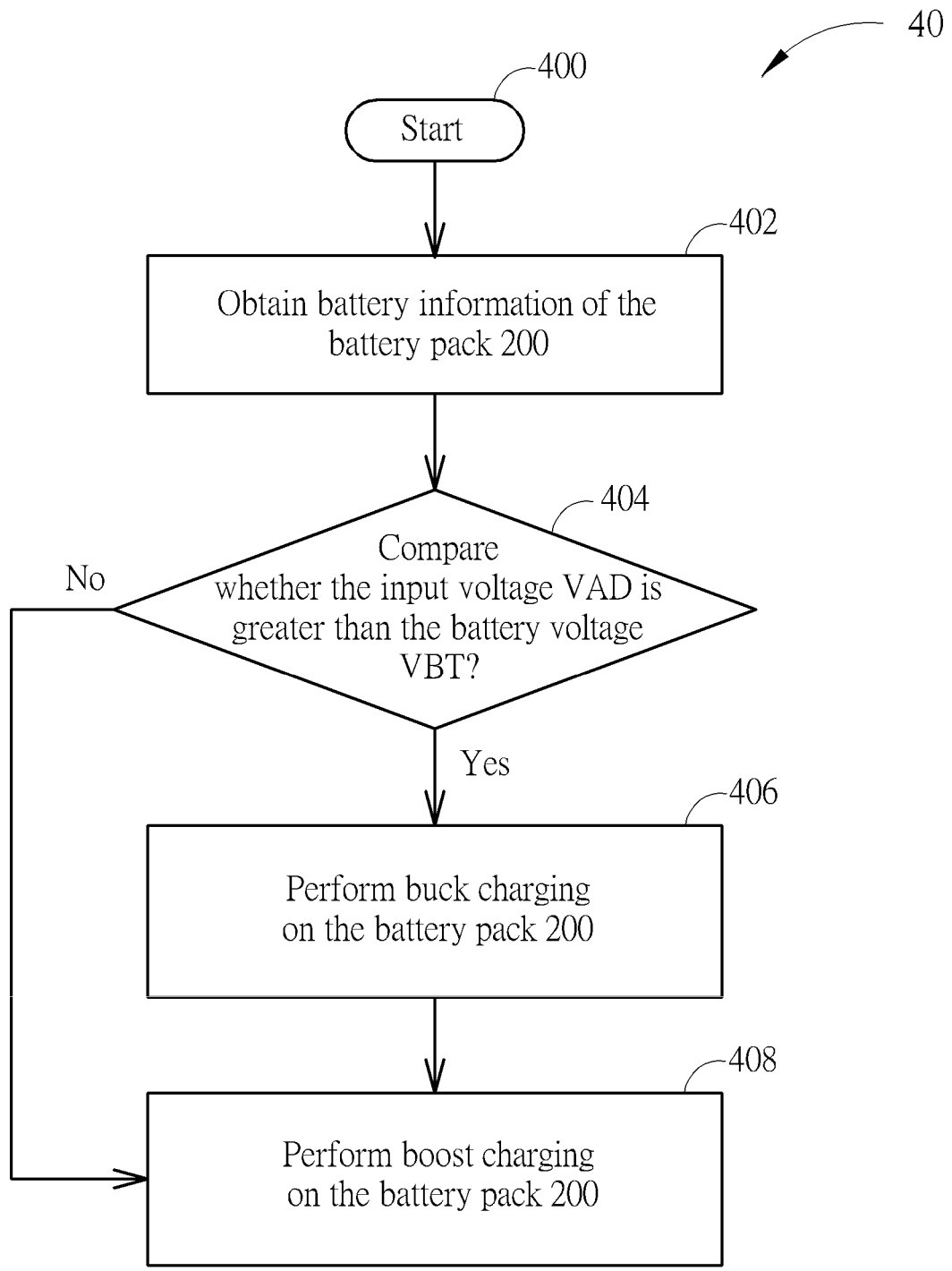
FIG. 4 is a schematic diagram of a process.

Please refer to FIG. 4, which is a schematic diagram of the process 40. The process 40 includes the following steps:

Step 400: Start.

Step 402: Obtain battery information of the battery pack 200.

Step 404: Compare whether the input voltage VAD is greater than the battery voltage VBT? If yes, go to Step 406; otherwise, go to Step 408.

Step 406: Perform buck charging on the battery pack 200.

Step 408: Perform boost charging on the battery pack 200.

Step 410: End.

The process 40 is related to the operations of the charging circuit 20, which is detailed in the above paragraphs and will not be narrated herein. Therefore, by using the process 40, the charging circuit 20 can perform boost or buck charging on the battery according to whether the input voltage VAD is greater than or less than the battery voltage VBT.

To sum up, when the input voltage of the adaptor is greater than the battery voltage, the buck charging unit performs buck charging on the battery pack. When the input voltage of the adaptor is less than the battery voltage, the boost charging unit performs boost charging on the battery pack. Therefore, even if the input voltage is less than the battery voltage, the charging circuit can still perform boost charging on the battery pack, and the charging function for the battery pack is not limited to the condition that the input voltage should be greater than the battery voltage. As a result, the portable electronic devices having charging functions will not require various adaptors to support different external voltage sources, and the battery can be charged without additional boost circuits, so that the costs and circuit complexity can be reduced significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charging circuit for an electronic device comprising:
   a battery pack, for providing a battery voltage;
   an adaptor, coupled to an external voltage source, for providing an input voltage;
   a charging module, coupled to the adaptor, for charging the battery pack, the charging module comprising:
      a buck charging unit, for performing buck charging on the battery pack according to a comparison result; and
      a boost charging unit, for performing boost charging on the battery pack according to the comparison results;
   a first switch, coupled to the adaptor, for controlling coupling between the adaptor and the charging module to be turned on or off;
   a second switch, coupled to the first switch, for controlling the coupling between the adaptor and the charging module to be turned on or off; and
   a third switch, coupled to the battery pack, for controlling coupling of the battery pack to be turned on or off.

2. The charging circuit of claim 1, wherein the charging module further comprises a comparator, coupled to the adaptor and the battery pack, for comparing the input voltage and the battery voltage to generate the comparison result.

3. The charging circuit of claim 2, wherein the buck charging unit performs buck charging on the battery pack when the comparison result indicates that the input voltage is greater than the battery voltage.

4. The charging circuit of claim 2, wherein the boost charging unit performs boost charging on the battery pack when the comparison result indicates that the input voltage is less than the battery voltage.

5. The charging circuit of claim 1, wherein the electronic device further comprises a controller, coupled to the adaptor and the battery pack, for comparing the input voltage and the battery voltage to generate the comparison result.

6. The charging circuit of claim 5, wherein the buck charging unit performs buck charging on the battery pack when the comparison result indicates that the input voltage is greater than the battery voltage.

7. The charging circuit of claim 5, wherein the boost charging unit performs boost charging on the battery pack when the comparison result indicates that the input voltage is less than the battery voltage.

8. The charging circuit of claim 1, further comprising:
   a first sensing resistor, coupled to the second switch, for detecting a first current from the adaptor; and
   a second sensing resistor, coupled to the battery pack, for detecting a second current entering the battery pack when the battery pack is charging.

9. The charging circuit of claim 1, wherein the electronic device is a portable electronic device having a charging function.

10. A charging method for an electronic device having a battery pack, the charging method comprising:
    providing a battery voltage via the battery pack;
    providing an input voltage via an adaptor;
    comparing the input voltage of the adaptor and the battery voltage of the battery pack to generate a comparison result; and
    performing different types of charging on the battery pack according to the comparison result;
    applying a first switch coupled to the adaptor, for controlling coupling between the adaptor and the charging module to be turned on or off;
    applying a second switch coupled to the first switch, for controlling the coupling between the adaptor and the charging module to be turned on or off; and
    applying a third switch coupled to the battery pack, for controlling coupling of the battery pack to be turned on or off.

11. The charging method of claim 10, further comprising obtaining battery information of the battery pack, wherein the battery information of the battery pack comprises the battery voltage of the battery pack and a charging current of the battery pack.

12. The charging method of claim 10, wherein the step of performing different types of charging on the battery pack according to the comparison result comprises performing buck charging on the battery pack when the comparison result indicates that the input voltage is greater than the battery voltage.

13. The charging method of claim 10, wherein the step of performing different types of charging on the battery pack according to the comparison result comprises performing boost charging on the battery pack when the comparison result indicates that the input voltage is less than the battery voltage.

14. The charging method of claim 10, wherein the electronic device is a portable electronic device having a charging function.

* * * * *